United States Patent [19]

Fukushima et al.

[11] Patent Number: 4,965,574
[45] Date of Patent: Oct. 23, 1990

[54] VARIABLE-BRIGHTNESS DISPLAY FOR USE IN A NAVIGATION SYSTEM FOR A VEHICLE

[75] Inventors: Atsuhiko Fukushima; Takashi Kashiwazaki; Masayuki Hosoi; Hitoshi Ando, all of Saitama, Japan

[73] Assignee: Pioneer Electronic Corporation, Tokyo, Japan

[21] Appl. No.: 114,981

[22] Filed: Oct. 30, 1987

[30] Foreign Application Priority Data

Oct. 30, 1986 [JP] Japan .................................. 61-259225

[51] Int. Cl.⁵ .......................... G09G 1/28; H04N 5/58
[52] U.S. Cl. ..................................... 340/995; 340/702; 340/793; 358/161
[58] Field of Search ............... 340/990, 995, 793, 702, 340/703, 767; 358/169, 161, 27, 168

[56] References Cited

U.S. PATENT DOCUMENTS

| | | | |
|---|---|---|---|
| 3,164,673 | 1/1965 | Sharon | 358/169 |
| 3,928,867 | 12/1975 | Lynch | 358/169 |
| 4,274,094 | 6/1981 | Noguchi | 340/793 |
| 4,451,849 | 5/1984 | Fuhrer | 358/169 |
| 4,511,921 | 4/1985 | Harlan et al. | 358/169 |
| 4,514,727 | 4/1985 | Van Antwerp | 340/793 |
| 4,527,155 | 7/1985 | Yamaki et al. | 340/990 |
| 4,578,673 | 3/1986 | Yianilos et al. | 358/27 |
| 4,651,064 | 3/1987 | Parker et al. | 358/169 |
| 4,679,147 | 7/1987 | Tsujii et al. | 340/995 |
| 4,682,228 | 7/1987 | Ando et al. | 358/161 |
| 4,725,833 | 2/1988 | Nakamura | 340/793 |
| 4,752,771 | 6/1988 | Katogi et al. | 340/793 |
| 4,774,580 | 9/1988 | Miyasako | 358/169 |
| 4,794,386 | 12/1988 | Bedrij et al. | 340/703 |
| 4,799,053 | 1/1989 | Van Aken et al. | 340/703 |

FOREIGN PATENT DOCUMENTS 0038378  2/1987  Japan .................................. 340/990

OTHER PUBLICATIONS

SAE Technical Paper Series, 830659, Mar., 1983, "Electro Gyrocator", Tagami et al., pp. 8-9.

Primary Examiner—Joseph A. Orsino
Assistant Examiner—Brent Swarthout
Attorney, Agent, or Firm—Sughrue, Mion, Zinn, MacPeak & Seas

[57] ABSTRACT

A display device applied to a navigation system for a vehicle displaying map information by using a color pallet. The device comprises means for supplying at least a signal distinguishing a bright and a dark environment according to the degree of brightness degree in a passenger compartment of the vehicle. Color pallets have their contents changed according to the information from the supply means. The contents of the registers are changed so that a degree of brightness of background color of a display unit is decreased to less than a decreased degree of brightness of colors displaying the information on the display unit when the output information of the supply means changes from the brightness to the darkness.

5 Claims, 4 Drawing Sheets

| REG | COLOR |
|---|---|
| 0 | BLACK |
| 1 | BLUE |
| 2 | RED |
| 3 | PURPLE |
| 4 | GREEN |
| 5 | LIGHT BLUE |
| 6 | YELLOW |
| 7 | WHITE |

| G | R | B |
|---|---|---|
| 10 | 10 | 10 |
| 0 | 0 | 15 |
| 0 | 15 | 0 |
| 0 | 15 | 15 |
| 15 | 0 | 0 |
| 15 | 0 | 15 |
| 15 | 15 | 0 |
| 15 | 15 | 15 |

| G | R | B |
|---|---|---|
| 0 | 0 | 0 |
| 0 | 0 | 8 |
| 0 | 8 | 0 |
| 0 | 8 | 8 |
| 8 | 0 | 0 |
| 8 | 0 | 8 |
| 8 | 8 | 0 |
| 8 | 8 | 8 |

4,965,574

VARIABLE-BRIGHTNESS DISPLAY FOR USE IN A NAVIGATION SYSTEM FOR A VEHICLE

BACKGROUND OF THE INVENTION

The present invention relates to a display device having a display unit which displays map information for use in a navigation system for a vehicle.

Recently, a navigation system has been studied and developed for a vehicle for leading the vehicle to a predetermined destination. The system has a display unit displaying map information prestored in and read from a memory, together with a place pointed out on the map where the vehicle is at present.

In such a navigation system, the display unit is located in the passenger compartment of the vehicle. Therefore, whether the information displayed on the display unit is clear to observe or not depends on the ambient light level in the passenger compartment. That is, in the daytime, the image on the display unit should be brightened to make it clearly observable since the ambient light level is often quite high. On the other hand, at night, if the color on the display unit is the same as that displayed in the daytime, eye fatigue may result since the display may be excessively bright for nighttime conditions.

In order to eliminate the above problem, in a conventional display device, the brightness of the display unit is decreased at night by a dimmer or the like. However, the conventional device is disadvantageous in that the information displayed on the display unit is sometimes indistinct.

SUMMARY OF THE INVENTION

The present invention was made in view of the aforementioned disadvantages of the conventional system.

Therefore, an object of the present invention is to provide a display device for use in a navigation system for a vehicle in which map information displayed on a display unit can be clearly observed independently of the ambient light level in the passenger compartment of the vehicle.

In the device of the invention, an image displayed on the display unit changes in accordance with the brightness level in the passenger compartment of the vehicle. The display device of the present invention is provided with a color pallet having therein a register, the contents of which are changed so that when the passenger compartment of the vehicle is darkened, the brightness of the background color in the display unit is decreased to less than a decreased brightness of colors with which information is displayed.

DESCRIPTION OF THE PREFERRED EMBODIMENTS

The present invention will be described in detail with reference to accompanying drawings.

Figure 1:
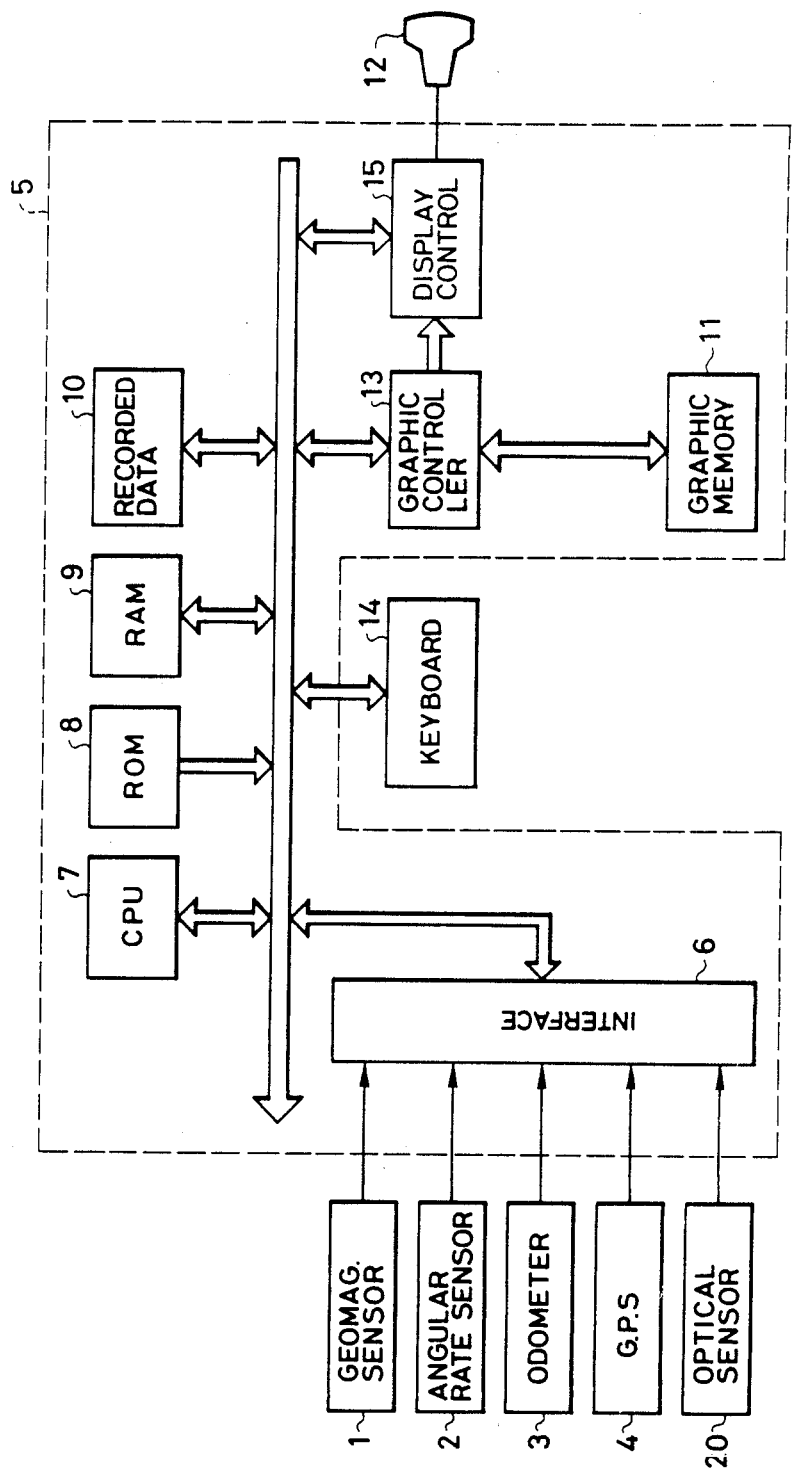
FIG. 1 is a block diagram showing a navigation system for a vehicle to which a display device of the present invention can be applied.

FIG. 1 is a block diagram showing a navigation system for a vehicle to which a display device of the invention can be applied. The navigation system includes a geomagnetic sensor 1 for outputting directional data of the vehicle's orientation based on the geomagnetic field of the earth. An angular rate sensor 2 detects the angular rate of change of the orientation of the vehicle. A driving distance sensor (odometer) 3 detects the distance the vehicle has moved. A GPS (Global Positioning System) receiver 4 detects the vehicle's present location according to the latitude and the longitude information and the like received from GPS satellites. The output signals of these sensors are supplied to a system controller 5. The system controller 5 includes an interface 6, a CPU (Central Processing Unit) 7, a ROM (Read Only Memory) 8, a RAM (Random Access Memory) 9, a recording medium 10, a graphic memory 11, a graphic controller 13, and a display control circuit 15. The interface 6 digitizes the analog output signals of the sensors. The CPU 7 processes many kinds of pictorial information, and calculates, for example, the distance the vehicle has moved based on the data supplied sequentially from the sensors. Executable programs for the CPU 7 and information necessary for the system are previously written in the ROM 8. Information necessary for executing the programs for the CPU 7 is written in and read from the RAM 9. Digitized (evaluated) map information is stored in the recording medium 10, which may be a CD-ROM, (Compact Disk Read Only Memory), a semiconductor IC memory, or the like. The graphic memory 11 may be implemented with a V-RAM (Video RAM), for example. The graphic controller 13 receives the graphic data, such as map information, and outputs it as picture information. The graphic data is stored in the graphic memory 11 by the graphic controller 13. The display control circuit 15 controls a display unit 12, such as a CRT (Cathode Ray Tube) or the like, based on the graphic data outputted from the graphic controller 13. An input device 14 such as a keyboard supplies some types of instructions to the system controller 5 from a keyboard or keypad operated by the user of the system.

Figure 2:
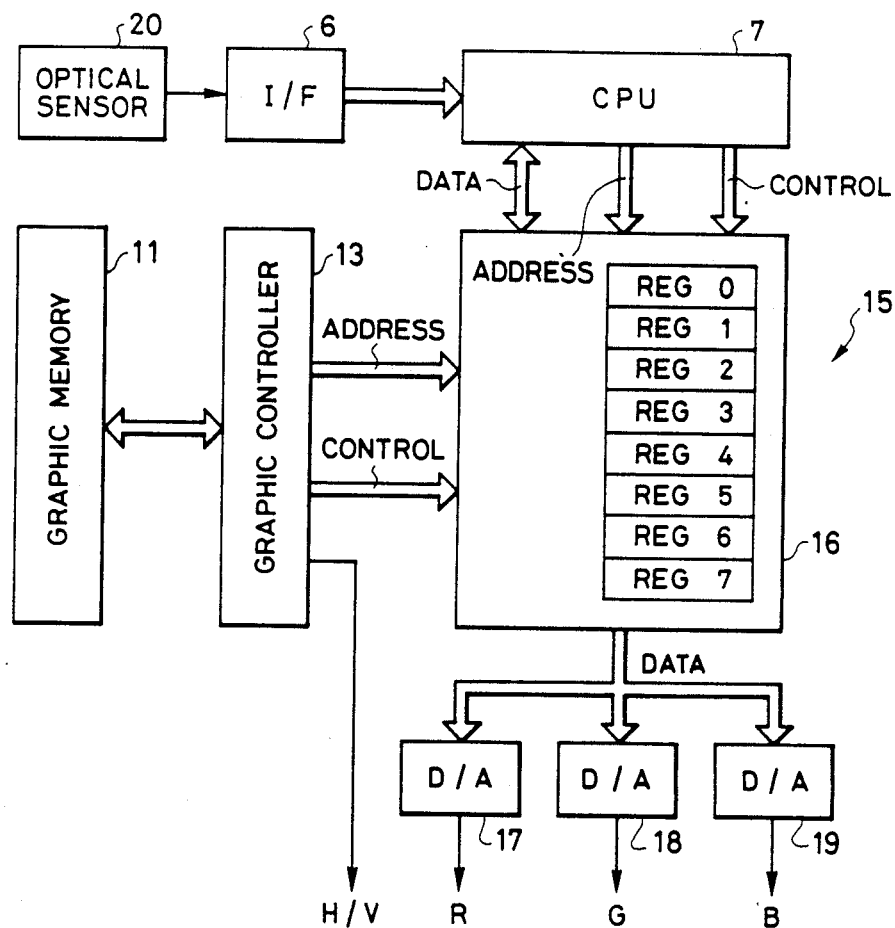
FIG. 2 is a block diagram showing a preferred embodiment of a display device of the invention.

FIG. 2 is a block diagram showing a preferred embodiment of the display device according to the present invention. In FIG. 2, like parts and components are designated by the same reference numerals as FIG. 1.

As shown in FIG. 2, the display control circuit is provided with a two-port RAM 16 having therein color pallet registers and D/A converters 17, 18 and 19 which convert the digital data outputted from the two-port RAM 16 to analog form. An optical sensor 20 outputs data at least distinguishing a bright condition and a dark condition according to the degree of brightness in a passenger compartment of the vehicle. The output data of the optical sensor 20 is supplied to the CPU 7. The CPU 7 changes, according to the bright and dark data from the optical sensor 20, the contents of the color pallet registers in the two-port RAM 16 clock signal. A graphic controller 13 outputs the graphic data stored in the graphic memory 11, at TTL levels, together with the horizontal and vertical synchronizing singals and a dot clock signal.

Figures 3A, 3B, 3C, 5:
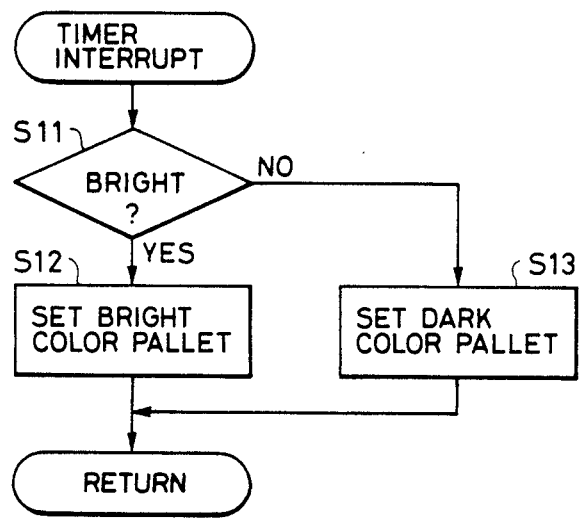
FIGS. 3A-3C show examples of the contents of a color pallet shown in FIG. 2.
FIG. 5 is a flowchart showing a program for an interrupt operation performed by the CPU.

The pallet registers in the two-port RAM are composed of eight registers 0 to 7. Each register corresponds to a predetermined color as shown in FIG. 3A. Each of these colors is expressible in the three colors R (Red), G (Green) and B (Blue). In FIG. 3B, level number "0" denotes a pedestal level and the number "15" is 100% in luminance brightness. Black color, corresponding to the register 0 is used as the background of the display unit 12. The contents of each of the registers is set by the CPU 7 to a predetermined luminance group for the bright condition shown in FIG. 3B and that for the dark condition shown in FIG. 3C. In the luminance group for the bright condition, the black color (register 0) has the same color distribution as the white color, but the luminance thereof is decreased to a level "10". Other colors (registers 1 to 7) are 100% in luminance level (level "15") as shown in FIG. 3B. On the other hand, in the luminance group for the dark condition, the black color is completely non-luminant (level "0"), and the other colors are approximately half in luminance level (level number "8") as shown in FIG. 3C compared to those for the bright condition of FIG. 3B.

The operations of the display device constructed above will be described hereinafter.

The graphic controller 13 outputs data of three bits together with the horizontal and vertical synchronizing signals and the dot clock signal according to the graphic data stored in the graphic memory 11. In the two-port RAM 16, if the three-bit data from the graphic controller 13 denotes "0" in decimal arithmetic, the register 0 is accessed. Similarly, the three bits of data of "1" through "7" correspond to the registers 1 through 7, respectively. Each of the registers 0 to 7 has 12 bits and outputs to the D/A converters 17, 18 and 19 which correspond to the R, G and B colors, respectively. Each of the D/A converters receives from the registers 1 through 7, through the data bus, four bits of data indicating the luminance level number in synchronization with the dot clock signals. If the four bits of data indicate the luminance level number "0", the D/A converter outputs a signal corresponding to a pedestal level. Similarly, if the data shows the level number "15", the converter outputs a signal corresponding to a white peak level.

The content of each of the registers in the two-port RAM 16 is set selectively to the level group for the bright condition shown in FIG. 3B or that for the dark condition shown in FIG. 3C. These data are set by the CPU 7 through a data bus, an address bus and a control bus.

As described above, in the device of the present invention, the contents of the registers in the color pallet are selected by the CPU 7 according to the brightness and darkness information from the optical sensor 20. Therefore, the color displayed on the display unit 12 can be changed without changing the graphic data stored in the graphic memory 11.

Figure 4:
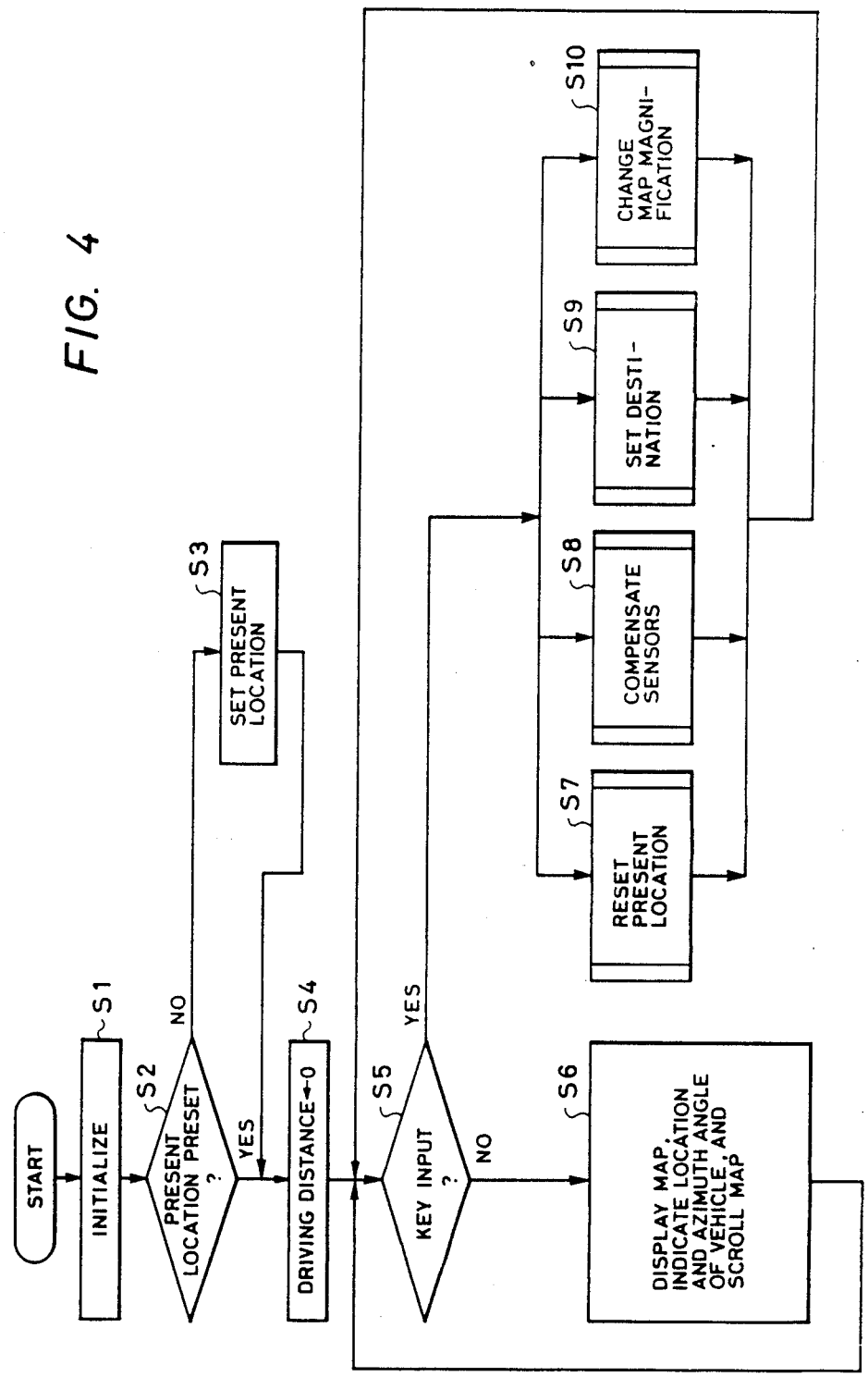
FIG. 4 is a flowchart showing a basic program executed by a CPU shown in FIG. 1.

FIG. 4 is a flowchart showing the basic operations performed by the CPU 7.

The CPU 7 first performs an initializing step for operating the program (step S1), and then determines whether or not information of the location where the vehicle is at present has been preset (step S2). If the information is not preset, then a present location setting program is performed (step S3) by, for example, a key operation of the input device 14. Next, the driving distance is set to "0" (step S4). After that, a test is made as to whether the key input is operated or not (step S5).

If no key input operation is determined at step S5, a map of the area around the vehicle is displayed on the display unit 12, and the location where the vehicle is at present and its azimuth angle are pointed out on the map with a vehicle mark or the like. When the vehicle moves, the map is scrolled correspondingly to thereby always display the location where the vehicle is at present on the display unit 12. In this condition, if a position of the vehicle on the display unit 12 almost crosses over the edge of the area of the map data stored in the graphic memory 11, necessary additional map data is read from the recording medium 10 and displayed on the display unit 12 (step S6).

If the key input is operated, one or more steps are performed according to an instruction of the key input. The location where the vehicle is at present may be reset (step S7). The sensors may be compensated (step S8). The destination may be set (step S9). The map may be magnified or reduced (step S10).

A timer interrupt routine is executed by the CPU 7 as shown in FIG. 5.

In this operation, steps S11 to S13 are performed as follows. The output of the optical sensor 20 is always observed (step S11). If the optical sensor 20 outputs bright condition information, the contents of the color pallet in the two-port RAM 16 are set to the luminance group for the bright condition shown in FIG. 3B (step S12). If the optical sensor 20 outputs dark condition information, the contents of the color pallet in the two-port RAM are set to the luminance group for the dark condition shown in FIG. 3C (step S13).

According to the above-described embodiment, the optical sensor 20 outputs merely two steps of information, that is, the bright condition and the dark condition and the colors displayed on the display unit 12 are selected from merely the two groups according to the brightness in the passenger compartment of the vehicle. However, the present invention is not limited thereto. More than two groups of colors may be used, or the colors displayed on the display unit 12 can continuously be changed according to the degree of the brightness in the passenger compartment of the vehicle.

Further, according to the embodiment described above, the CPU 7 receives the information for the brightness from the optical sensor 20. However, the information of the brightness can be obtained by an output signal of a light switch for head lamps of the vehicle, for example.

According to the display device of the present invention as described above, the colors displayed on the display unit can be changed without changing the graphic data stored in the graphic memory by changing the contents of the color pallet registers according to the brightness in the passenger compartment of the vehicle. Therefore, the map displayed on the display unit can be clearly observed by the passenger of the vehicle without being washed out by the background light in the passenger compartment of the vehicle, and this can be accomplished with a device simple in construction.

What is claimed is:

1. A display device, comprising:
   a display disposed in an ambient brightness;
   means for generating a brightness signal indicating a degree of said ambient brightness;
   means for displaying information and a background on said display device, said displaying means including a plurality of registers having data for determining a brightness of said displayed information and of said displayed background, and the brightness of said information and said background is displayed by said displaying means according to the contents of said registers; and means for controlling said registers so as to change the contents thereof in accordance with said generated brightness signal.

2. A display device, comprising:

a display disposed in an ambient brightness;

means for generating a brightness signal indicating a degree of said ambient brightness;

means for displaying information and a background on said display device, said displaying means including a plurality of registers having data for determining a brightness of said displayed information and of said displayed background, and the brightness of said information and said background is displayed by said displaying means according to the contents of said registers; and means for controlling the contents of said registers according to said generated brightness signal, wherein said controlling means changes the contents of said registers such that when said brightness signal indicates a reduction of said degree of said ambient brightness, said brightness of said displayed background is decreased and said brightness of said displayed information is decreased.

3. The display device as recited in claim 2, wherein said data of said registers are luminances of three colors for said displayed information and said displayed background, and said controlling means decreases said luminances for said displayed background more than for said displayed information when said brightness signal indicates a reduction of said degree of said ambient brightness.

4. A navigation system comprising:

a display disposed in an ambient brightness;

means for generating a brightness signal indicating a degree of said ambient brightness;

means for displaying information and a background on said display device, said displaying means including a plurality of registers having data for determining a brightness of said displayed information, and the brightness of said information and said background is displayed by said displaying means according to the contents of said registers;

means for controlling said registers so as to change the contents thereof in accordance with said generated brightness signal; and a navigator device installed in a passenger compartment of a movable vehicle for displaying map information on said display, said passenger compartment having said ambient brightness.

5. The display device as recited in claim 2, wherein when said brightness signal indicates a reduction of said degree of brightness, said controlling means changes the contents of said registers so that the brightness of said displayed background is decreased more than the brightness of said displayed information is decreased.

* * * * *